US012296759B2

(12) United States Patent
Khouphongsy et al.

(10) Patent No.: US 12,296,759 B2
(45) Date of Patent: May 13, 2025

(54) HEADLINER IMPACT SYSTEM

(71) Applicant: Toyota Motor Engineering & Manufacturing North America, Inc., Plano, TX (US)

(72) Inventors: Phouvadol P. Khouphongsy, Saline, MI (US); Umesh N. Gandhi, Farmington Hills, MI (US); Danil V. Prokhorov, Canton, MI (US); Yuyang Song, Ann Arbor, MI (US); Mizuho Takayama, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 202 days.

(21) Appl. No.: 18/128,695

(22) Filed: Mar. 30, 2023

(65) Prior Publication Data
US 2024/0326718 A1 Oct. 3, 2024

(51) Int. Cl.
B60R 13/02 (2006.01)
B60R 21/01 (2006.01)
B60R 21/04 (2006.01)

(52) U.S. Cl.
CPC .......... B60R 13/0212 (2013.01); B60R 21/04 (2013.01); B60R 2021/01013 (2013.01); B60R 2021/0442 (2013.01)

(58) Field of Classification Search
CPC .............. B60R 21/206; B60R 13/0225; B60R 13/0212; B60R 21/04; B60R 2021/0442; B60R 2021/01013

USPC .................................................. 280/751, 753
See application file for complete search history.

(56) References Cited

U.S. PATENT DOCUMENTS

| 5,823,611 | A | 10/1998 | Daniel et al. |
| 5,833,304 | A | 11/1998 | Daniel et al. |
| 6,475,937 | B1* | 11/2002 | Preisler .................. B60R 21/04 296/187.05 |
| 7,338,038 | B2 | 3/2008 | Maurer et al. |
| 7,350,851 | B2* | 4/2008 | Barvosa-Carter .......................... B60N 2/42709 296/187.02 |
| 7,384,095 | B2 | 6/2008 | Cormier et al. |
| 8,186,748 | B2 | 5/2012 | Chickmenahalli et al. |
| 10,006,515 | B2* | 6/2018 | Tamada ................. B60J 5/0451 |
| 11,760,418 | B2* | 9/2023 | Selvasekar ............ B62D 25/06 296/187.03 |
| 2003/0197354 | A1* | 10/2003 | Beland ................ B60R 13/0225 280/751 |

(Continued)

FOREIGN PATENT DOCUMENTS

EP  1220765 A1  12/2003

Primary Examiner — Paul N Dickson
Assistant Examiner — Caitlin Anne Miller
(74) Attorney, Agent, or Firm — Christopher G. Darrow; Darrow Mustafa PC

(57) ABSTRACT

Systems, methods, and other embodiments described herein relate to vehicle headliners. In one embodiment, a method includes detecting, with a controller connected to a first impact feature of a headliner of a vehicle, a physical contact with the first impact feature with the first impact feature having a first bending strength prior to the physical contact. The controller subsequently activates the first impact feature to transition the first impact feature from the first bending strength to a second bending strength in response to the detected physical contact.

16 Claims, 4 Drawing Sheets

(56) References Cited

U.S. PATENT DOCUMENTS

2004/0198123 A1    10/2004  Gillingham et al.
2005/0168015 A1     8/2005  Davey et al.
2017/0072889 A1*    3/2017  Whitens ................. B60R 21/04
2018/0211752 A1*    7/2018  Villacres Mesias .... H01F 7/126

* cited by examiner

HEADLINER IMPACT SYSTEM

TECHNICAL FIELD

The subject matter described herein relates, in general, to vehicle headliners and, more particularly, to mitigating impact severity with dynamic energy absorption characteristics of an impact feature.

BACKGROUND

A headliner can serve both aesthetic and functional purposes for a vehicle. As the shapes, sizes, and material construction of headliners has advanced over time, contours can be provided to accentuate potentially elaborate designs. Various energy absorbing materials, such as foam or fabric, have been incorporated into, and onto, a headliner to provide a factor of safety in the event a vehicle occupant contacts portions of the headliner. However, the aesthetic considerations of how a headliner looks and feels has limited the incorporation of safety features capable of providing sophisticated energy absorption to improve impact safety.

SUMMARY

In one embodiment, a method for operating at headliner includes detecting, with a controller connected to a first impact feature of a headliner of a vehicle, a physical contact with the first impact feature with the first impact feature having a first bending strength prior to the physical contact. The controller subsequently activates the first impact feature to transition the first impact feature from the first bending strength to a second bending strength in response to the detected physical contact.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving vehicle safety. As previously described, conventional headliners with static energy absorption capabilities can employ simple impact energy dissipation structures for the sake of aesthetic concerns, which may jeopardize influence the safety of vehicle occupants during a collision.

The incorporation of an impact feature with dynamic energy absorption capabilities can provide increased impact safety without sacrificing design and aesthetic considerations for a headliner. Accordingly, various embodiments are directed to a vehicle headliner that employs at least one impact feature that changes flexibility, energy absorption characteristics, and bending strength in response to a detected impact to provide increased safety.

The dynamic physical properties of an impact feature allows a headliner to have a relatively wide variety of contours, shapes, sizes, and materials that exhibit aesthetically pleasing looks and feel prior to impact and heightened energy absorption during impact. The ability to utilize impact features that are reactive to impact with elevated energy absorption allows an impact feature to be strategically located to receive impact from a vehicle occupant without occupying the entirety of the headliner. In this way, the disclosed systems, methods, and other embodiments improve energy absorption to mitigate impact severity and improve vehicle occupant safety.

Figure 1:
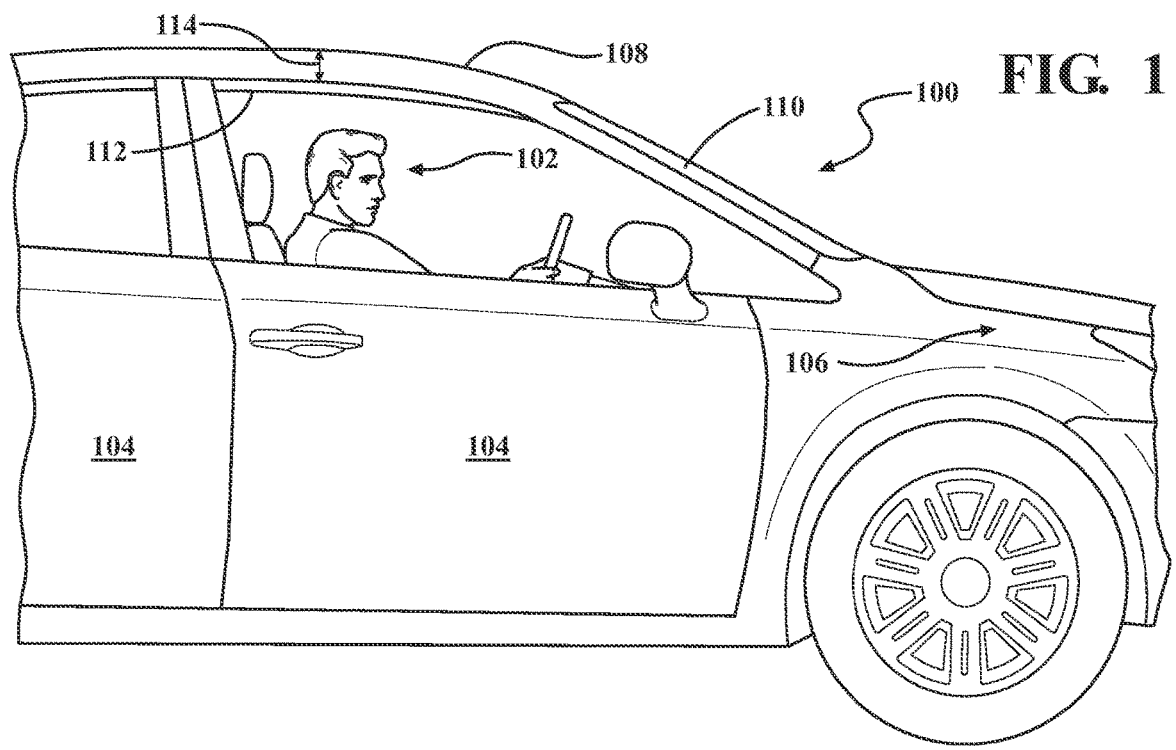
FIG. 1 illustrates an example vehicle environment in which assorted embodiments can be implemented.

Referring to FIG. 1, an example vehicle environment 100 is illustrated in which assorted embodiments of a headliner system can be practiced. An occupant 102 is positioned within a rigid vehicle frame that provides a safety shell in the event of a collision. The rigid characteristics of the vehicle's doors 104, engine compartment 106, roof 108, and supporting pillars 110 allow for consistent vehicle performance and protection from external objects and weather.

A headliner 112 can be positioned between the occupant 102 and various portions of the vehicle's rigid external shell. The headliner may have any number of parts, materials, and constituent contours to hide the underside of the roof 108 while providing an aesthetic design. It is contemplated that a headliner incorporates any number of functional aspects, such as lights, electronic controls, monitors, and compartments. While a headliner 112 can provide aesthetic design and functionality, position of the headliner 112 is often separated from the rigid aspects of the roof 108 to accommodate such functional aspects, as illustrated by gap 114.

As a result, the headliner 112 may move and/or compress in response to an impact without dissipating much energy, which jeopardizes the safety of the occupant 102. That is, movement, or flexing, of portions of the headliner 112 in response to contact by the occupant 102 can minimally dissipate energy and allow the occupant to contact the rigid portions of the roof 108 and/or pillars 110 in an unsafe manner. It is noted that assorted energy absorbing materials, such as olefinic or polyurethane foam, can be positioned in the headliner gap 114, but such materials lack high enough energy absorption characteristics to provide ample occupant safety in the event of a collision. In other words, incorporating materials into, or around, the headliner 112 with static energy absorption, flexibility, or bending strength can provide some vehicle safety, but not enough to provide sufficient energy absorption and safety in modern vehicles capable of traveling long distances at relatively high speeds.

Figure 2:
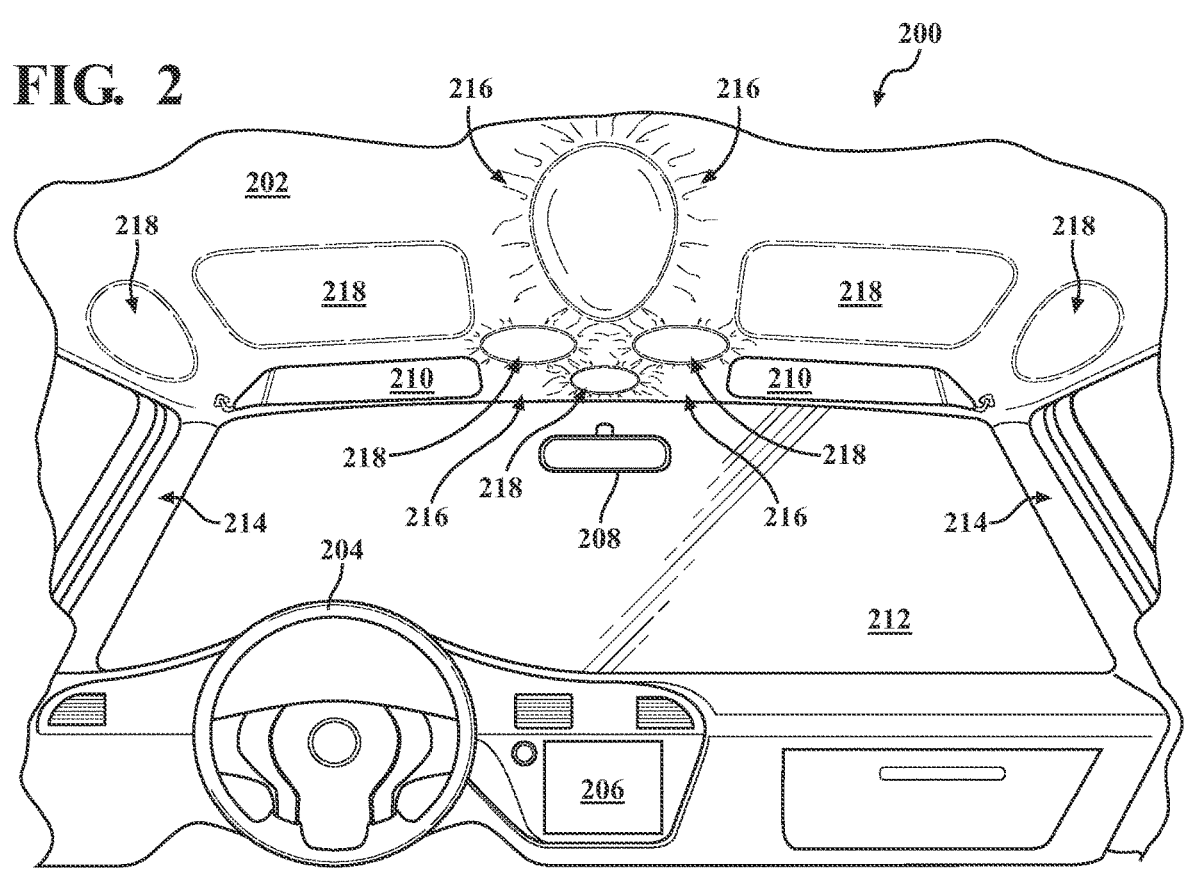
FIG. 2 illustrates one embodiment of a headliner impact system that can be practiced in the environment of FIG. 1.

With these issues in mind, embodiments of a headliner can provide dynamic energy absorption characteristics that allow sufficient design potential along with robust impact safety. FIG. 2 conveys portions of an example vehicle 200 configured with a headliner 202 arranged in accordance with various embodiments to provide dynamic energy absorption. The vehicle 200 can be arranged in a non-limiting variety of configurations that utilize a steering wheel 204 and user interface 206 to enable a driver to control vehicle movement and operation. Other interior vehicle aspects, such as a rearview mirror 208 and sun visors 210 can be oriented about a windshield 212 and rigid pillars 214.

As generally illustrated in FIG. 2, the headliner 202 can be designed with a variety of contours 216 that can result in an undulating topography and a differential energy absorption profile between the respective pillars 214. While a single energy absorbing structure could be constructed to fill the space between the headliner 202 and rigid vehicle structure, such as the roof and pillars 214, despite a varying topography, such structure can be relatively slow to effectively begin absorbing energy from impact with a vehicle occupant. Hence, assorted embodiments utilize physically separated impact features 218 configured with relatively small sizes, compared to conventional vehicle airbags and other compressible aspects of a headliner, to be able to react quickly to impact to transition from a low absorption mode to a high absorption mode.

The non-limiting embodiment of the headliner 202 displayed in FIG. 2 conveys how impact features 218 can be placed at strategic locations where impact is most likely to happen. It is noted that the assorted impact features 218 can be integrated into any portion of the headliner 202, such as wholly contained within a cover, attached to a bottom surface of a headliner body in order to face a vehicle occupant, or attached to a top surface of a headliner body in order to fill a gap between the headliner and rigid vehicle structure. Thus, the block representations of the respective impact features 218 shown in FIG. 2 are meant to convey general position, size, and shape, without limiting the configuration of any portion of the headliner 202.

Assorted embodiments of the headliner 202 utilize a combination of differently sized impact features 218 to provide a combination of aesthetic design considerations and energy absorption transition speed. In other words, the various impact features 218 can have a size, thickness, shape, and location to allow ornate and/or elaborate headliner designs that consist of valleys, ridges, protrusions, and other contours while being positioned in strategic locations that are likely to encounter occupant contact in the event of a collision. The aesthetic design capabilities of the headliner 202 are further enabled by the construction of the respective impact features 218 to have a low energy absorption mode that corresponds with high flexibility and low bending strength.

The ability to arrange separate impact features 218 with different physical sizes and shapes allows a headliner 202 to have an optimized balance of aesthetic design and impact mitigation. For example, the use of impact features 218 that have a default high flexibility allow a rectangular shape to be used for planar or curvilinear portions of the headliner 202 and circular shapes to be used for ridge or contour portions of the headliner 202 without deterring from the aesthetic look and feel of the headliner. The capability of the respective impact features 218 to transition to a high energy absorption mode in response to detected, or predicted, physical contact corresponds with the headliner 202 providing increased safety, which could compromise the design aesthetic of the headliner, only at times when safety is a priority, such as during a collision.

The diverse physical configurations of the assorted impact features 218 can be complemented by different operational constructions that provide diverse operational characteristics in response to detected, or predicted, physical contact. That is, a headliner 202 can employ impact features 218 with matching, or different, shapes, size, or thicknesses as well as matching, or different, operational configurations that each transition from a default low energy absorption, high flexibility state to a high energy absorption, low flexibility state, which allows for a wide range of headliner 202 customization that balances aesthetic design with safety. For instance, different impact features 218 of a headliner 202 can be constructed be relatively flexible and exhibit relatively minor energy absorption upon impact when a pressure, such as vacuum, or signal, such as an electrical signal, is applied that transitions a feature 218 to a stiff mode that absorbs greater amounts of energy in response to physical impact.

It is noted that one or more sensors 220 can be implemented into, or around, the headliner 202 to aid in the detection, or prediction, of an impact event. The type, size, and location of an incorporated sensor 220 is not limited and can be any electronic, mechanical, acoustic, optical, pressure, or thermal sensor that is capable of detecting an impact event that triggers the transition of an impact sensor to a high energy absorption state. For instance, a headliner 202 can incorporate different types of sensors to provide redundant, or complementary, measurements of vehicle and/or occupant conditions to identify if and where headliner impact will likely occur, which triggers the activation of at least one impact feature 218 via application of a pressure or electrical signal.

Figure 3A:
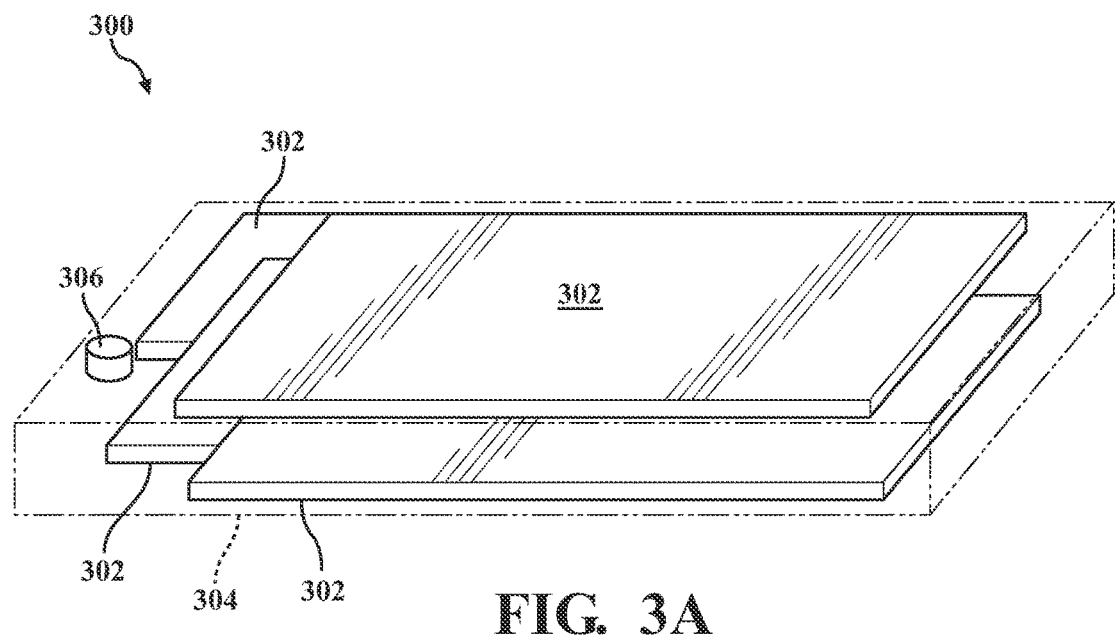
FIGS. 3A-3D respectively illustrate embodiments of example impact features that may be employed in the headliner impact system of FIG. 2.
Figure 3B:
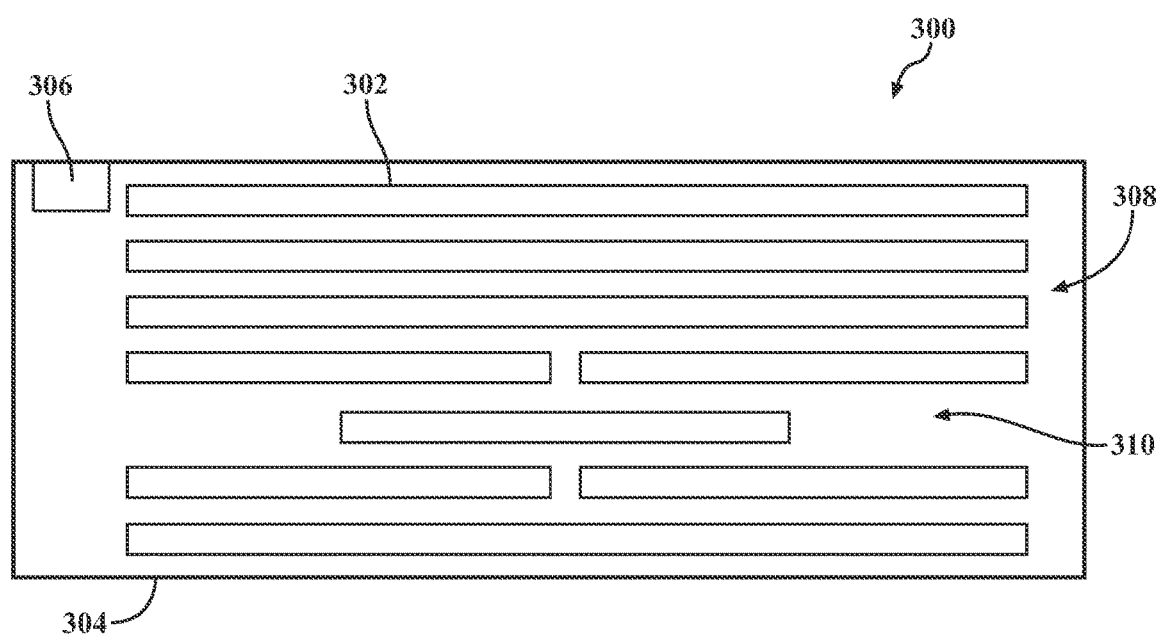

FIGS. 3A-3D respectively depict portions of example impact features that may be utilized in the headliner 202 of FIG. 2 and in the environment 100 of FIG. 1 in accordance with some embodiments. The non-limiting example impact feature 300 shown in FIG. 3A illustrates how a number of energy absorbing sheets of material 302 are positioned in a single vessel 304. The cross-sectional profile of the impact feature 300 is shown in FIG. 3B and conveys how the various sheets 302 can be layered within the vessel 304 with one or more ports 306 allowing selected access to the interior volume of the vessel 304.

The cross-sectional illustration of the impact feature 300 in FIG. 3B conveys non-limiting sheet 302 arrangements that can be utilized to provide predetermined physical characteristics and modes. For instance, the sheets 302 can be configured with matching, or dissimilar, cross-sectional areas, thicknesses, shapes, and lengths along the longitudinal axis of the vessel 304 to provide a first mode while the vessel 304 is at, or above, ambient air pressure and a second module while the vessel 304 is below ambient air pressure. Some embodiments position a number of sheet 302 in a stacked configuration with aligned edges, as shown in region 308, while other embodiments stagger multiple sheets 302 to overlap edges, as shown in region 310.

Although not required, or limiting, the configuration of the sheets 302 and vessel 304 as a whole can provide a greater amount of flexibility with lower bending strength and lower energy absorption during a first mode when the interior volume of the vessel 304 is at, or above, ambient pressure than during a second mode when the interior volume of the vessel 304 is below ambient air pressure. That is, the number, construction, and position of the sheets 302 corresponds with different physical characteristics when the interior of the vessel 304 is under sustained vacuum pressure. As a result of pulling a vacuum via the port 306, the impact feature 300 can transition between modes and provide greater energy absorption, greater bending strength, and lower flexibility than when the vessel 304 is at, or above, ambient air pressure.

The planar shape of the sheets 302 can provide the vessel 304 with a shape and capability for physical manipulation that is conducive to various portions of a vehicle headliner, as displayed in FIG. 2, but may experience relatively low compression capability. Changing the shape, size, and/or material construction of the interior of the vessel 304 can alter the vacuum pressure needed to transition between modes as well as the physical characteristics of the respective modes. For example, utilizing matching, or dissimilarly shaped, members within the vessel 304 can provide greater compression capability and different mode characteristics compared to the sheet 302 arrangement shown in FIGS. 3A and 3B.

Figure 3C:
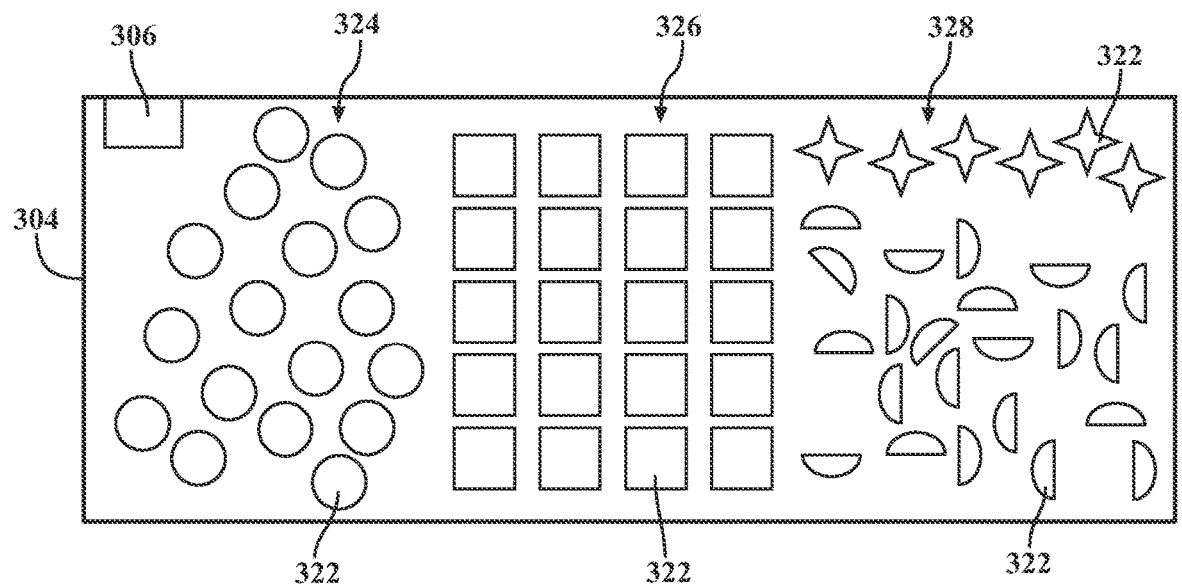

FIG. 3C illustrates a cross-sectional view of an impact feature 320 that employs a variety of separate members 322 that collectively provide a first mode while at, or above, ambient air pressure and a second mode while under vacuum pressure. The construction and configuration of the members 322 are not limited and can be arranged to provide distinct energy absorption states based on the amount of vacuum pressure applied to the vessel 304.

The example first region 324 conveys how members 322 with similar shapes and sizes can be packed with a density that corresponds with a dynamic compressibility, energy absorption, bending strength, and flexibility in response to vacuum pressure in the interior volume of the vessel 304. The example second region 326 conveys how members 322 can be uniformly packed to provide different impact feature 320 modes while region 328 shows how members 322 with different symmetrical or asymmetrical cross-sectional shapes can be packed with a non-uniform packing arrangement.

Various embodiments can configure the impact feature 320 with a common member 322 arrangement throughout the interior volume of the vessel 304. Other embodiments configure the vessel 304 with members 322 having different sizes, shapes, material construction, and/or packing arrangements. The use of separate members 322, compared to the planar sheets of feature 300, can provide a mode under vacuum with higher compressibility, greater energy absorption, and lower bending strength while still allowing a mode when not under vacuum that has high flexibility, low energy absorption, and reduced bending strength.

It is noted that the example impact features 300/320 of FIGS. 3A-3C selectively transition between different modes in response to applied pressure via the vessel port 306. However, a vehicle headliner, in some embodiments, can employ multiple separate impact features that have different configurations, operations, and physical characteristics. That is, a headliner can incorporate separate impact features that are each selectively activated to a high energy absorption mode by the application of vacuum pressure. A headliner, in other embodiments, can utilize impact features that are selectively activated to high energy absorption modes with the application of electrical signals.

Figure 3D:
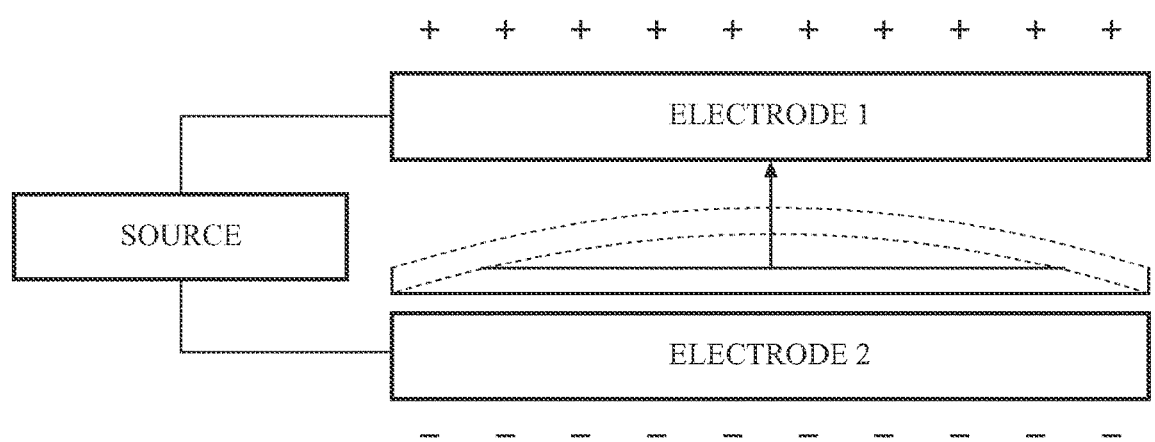

FIG. 3D is a block representation cross-sectional view of a portion of an example impact feature 330 that transitions between physical modes in response to the application of voltage. As shown, an electrical source 332 can provide electrical signals to separate electrodes 334 to induce a change in one or more component 336 to alter the physical characteristics of the impact feature 330. Such impact feature 330 configuration is not limited to the embodiments of FIG. 3D and can be arranged as any electrostatic mechanism response to electrical signals with dynamic energy absorption capabilities.

The non-limiting example of FIG. 3D conveys how electrical signals (+/−) can cause the intermediate component 336 to move, flex, or otherwise change to transition between a low energy absorption mode to a high energy absorption mode, as conveyed by solid arrow and segmented component shape. It is contemplated that the utilization of electrical signals to transition between energy absorption modes can also correspond with different physical characteristics for the impact feature 330, such as different bending strength, flexibility, compressibility, and size in response to a single, or continuous, application of electrical differential between the respective electrodes 334.

Figure 4:
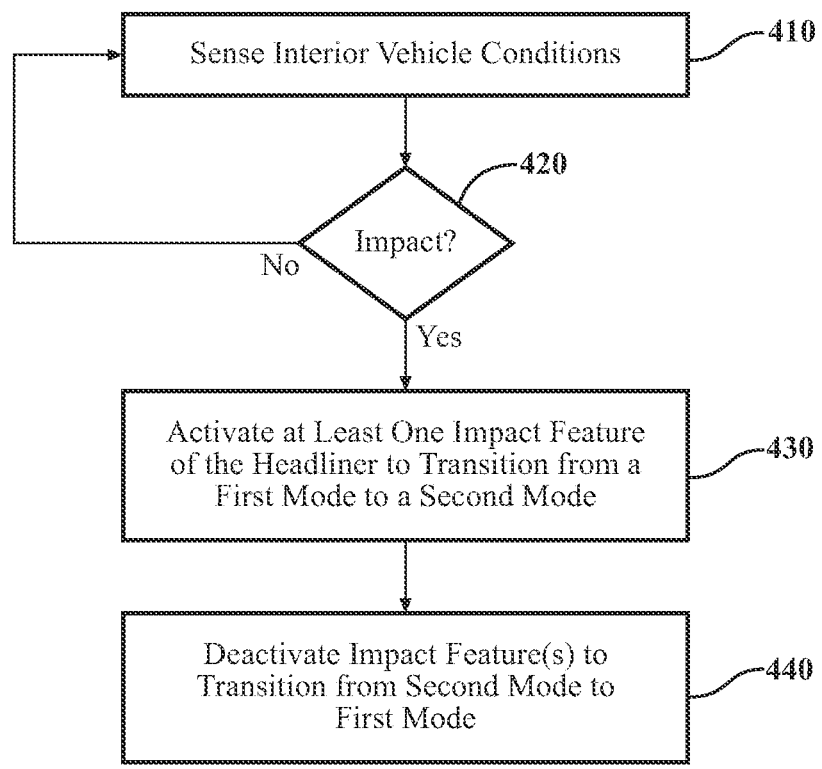
FIG. 4 illustrates a flowchart for one embodiment of a method for operating a headliner impact system.

FIG. 4 illustrates a flowchart of an example headliner operating routine 400 that can be carried out with the embodiments of FIGS. 2-3D. While routine 400 is discussed in combination with a headliner impact system, it should be appreciated that the routine 400 is not limited to the steps and decision shown in FIG. 4.

Prior to routine 400 increasing safety of a vehicle, at least one impact feature is incorporated into a headliner. It is contemplated that the headliner has an aesthetic design that consists of headliner contours, such as valleys, ridges, protrusions, compartments, and lights. The incorporation of at least one impact feature can involve attaching each impact feature to a top surface of a headliner body, which may be constructed of a fabric, ceramic, wood, polymer, or combination thereof.

The headliner can then be installed in a vehicle along with at least one sensor. It is noted that the sensors positioned to detect the status of the headliner and within the vehicle. The installation of the headliner, impact features, and sensors can involve establishing one or more sealed lines that allow for the alteration of the pressure of each impact feature to transition a selected impact feature from a low energy absorption mode to a high energy absorption mode. Installation of the headliner into a vehicle can additionally involve connecting a controller, such as a microprocessor or other programmable circuitry, to the sensor(s) via electrical interconnects and to the impact features via a pressure source, such as a fan or pump.

The installed headliner can be employed, in step 410, to sense conditions inside the vehicle. It is contemplated that additional conditions, of the vehicle itself and/or outside of the vehicle, are used in step 410 to assess the status and condition of the occupants, objects, pets, and other moveable aspects present in the interior of the vehicle. Such conditions are utilized in decision 420 to determine if portions of the headliner have been physically contacted, are in physical contact with, or will make physical contact with a moveable aspect of the interior of the vehicle. Such evaluation may be conducted continuously, periodically, or randomly to utilize the assorted vehicle sensors, such as the sensor(s) incorporated into the headliner, to accurately determine when and where headliner impact will occur.

If impact is detected, or predicted, by the controller, step 430 activates an impact feature at one or more selected headliner locations to increase the energy absorption capabilities of the selected impact feature, which proceeds to dissipate impact energy imparted on the headliner. A non-limiting embodiment activates an impact feature with the application of vacuum force to establish and maintain an impact feature vessel in a negative pressure state that corresponds with low flexibility, high bending strength, and high energy absorption. In the event no impact is detected or predicted in decision 420, the controller will continue to sense conditions to allow decision 420 to accurately identify when and where a headliner impact will occur.

At the conclusion of the activation of one or more headliner impact features, step 440 can proceed to deactivate the previously activated features to transition from the second operational mode to the first operational mode. For example, vacuum pressure may be turned off, ambient air pressure may be introduced, or positive pressure may be pumped into the selected impact feature(s) in step 440. The deactivation of an impact feature may, in some embodiments, allow a headliner to return to a default shape and contour that presents an aesthetic design without the apparent presence of the impact features.

Through the utilization of an impact feature that can be activated via the application of pressure or electricity, the amount of energy absorption for a headliner can be increased. The activation of an impact feature can increase the volume of energy absorption, particularly during the initial movement of the headliner in response to physical contact with a vehicle occupant. It is noted that the overall displacement of the headliner may be reduced through the use of high energy absorbing impact features.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:
   detecting, with a controller connected to a first impact feature of a headliner of a vehicle, a physical contact with the first impact feature, the first impact feature having a first bending strength prior to the physical contact; and
   activating, with the controller, the first impact feature to transition the first impact feature from the first bending strength to a second bending strength in response to the detected physical contact, wherein activating the first impact feature comprises compressing a lamination of sheets of material positioned in a sealed vessel.

2. The method of claim 1, wherein the first bending strength corresponds with a first energy absorption capability and the second bending strength corresponds with a second energy absorption capability.

3. The method of claim 1, wherein the second bending strength corresponds with a greater flexibility than the first bending strength.

4. The method of claim 1, wherein activating the first impact feature comprises applying a vacuum force to a port of the first impact feature.

5. The method of claim 1, wherein activating the first impact feature comprises applying electrical signals to electrodes of the first impact feature.

6. A method comprising:
   detecting, with a controller connected to a first impact feature of a headliner of a vehicle, a physical contact with the first impact feature, the first impact feature having a first bending strength prior to the physical contact; and
   activating, with the controller, the first impact feature to transition the first impact feature from the first bending strength to a second bending strength in response to the detected physical contact, wherein activating the first impact feature comprises compressing separate members positioned in a sealed vessel.

7. The method of claim 1, wherein activating the first impact feature comprises altering a portion of the first impact feature between a headliner cover and a roof of the vehicle.

8. The method of claim 1, wherein activating comprises activating a second impact feature in response to the detected physical contact, the second impact feature separated from the first impact feature.

9. The method of claim 8, wherein activating the second impact feature comprises creating a different bending strength than the second bending strength.

10. The method of claim 6, wherein the first bending strength corresponds with a first energy absorption capability and the second bending strength corresponds with a second energy absorption capability.

11. The method of claim 6, wherein the second bending strength corresponds with a greater flexibility than the first bending strength.

12. The method of claim 6, wherein activating the first impact feature comprises applying a vacuum force to a port of the first impact feature.

13. The method of claim 6, wherein activating the first impact feature comprises applying electrical signals to electrodes of the first impact feature.

14. The method of claim 6, wherein activating the first impact feature comprises altering a portion of the first impact feature between a headliner cover and a roof of the vehicle.

15. The method of claim 6, wherein activating comprises activating a second impact feature in response to the detected physical contact, the second impact feature separated from the first impact feature.

16. The method of claim 15, wherein activating the second impact feature comprises creating a different bending strength than the second bending strength.

* * * * *